United States Patent
Christiance et al.

(10) Patent No.: US 10,552,782 B2
(45) Date of Patent: Feb. 4, 2020

(54) DERIVING COMPARABLE PLANNED AND ACTUAL SERVICE DELIVERY COST METRICS

(71) Applicant: International Business Machines Corporation, Armonk, NY (US)

(72) Inventors: Kenneth D. Christiance, Cary, NC (US); Aaron T. Corette, Rochester, NY (US); Paul G. Easton, Hopewell Junction, NY (US); Linh H. Lam, Yorktown Heights, NY (US); Amitkumar M. Paradkar, Mohegan Lake, NY (US); Vugranam C. Sreedhar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1645 days.

(21) Appl. No.: 14/296,538

(22) Filed: Jun. 5, 2014

(65) Prior Publication Data
US 2015/0356473 A1    Dec. 10, 2015

(51) Int. Cl.
*G06Q 10/00*    (2012.01)
*G06Q 10/06*    (2012.01)
*G06Q 30/02*    (2012.01)

(52) U.S. Cl.
CPC ....... *G06Q 10/067* (2013.01); *G06Q 30/0283* (2013.01)

(58) Field of Classification Search
USPC ....................................................... 705/348
See application file for complete search history.

(56) References Cited

U.S. PATENT DOCUMENTS

| | | | |
|---|---|---|---|
| 7,894,677 B2 * | 2/2011 | Konig | G06K 9/6282 382/128 |
| 8,050,906 B1 * | 11/2011 | Zimmerman | G06F 17/2836 704/2 |
| 2008/0255891 A1 * | 10/2008 | Stone | G06Q 10/06 705/400 |
| 2011/0218839 A1 | 9/2011 | Shamaiengar | |

(Continued)

OTHER PUBLICATIONS

U.S. Appl. No. 14/296,538—EIC 3600 NPL Search Report (Year: 2018).*

(Continued)

*Primary Examiner* — Amanda C Abrahamson
*Assistant Examiner* — Johnathan J Lindsey, III
(74) *Attorney, Agent, or Firm* — Patrick J. Daugherty; Daugherty & Del Zoppo Co., LPA (57) ABSTRACT

Aspects generate costs for a business plan from normalized cost metric values by mapping (via a processor implementing an automated process) text artifacts of a business plan to different tags that each include a cost as a function of a time period for delivery of a service that is associated with a computer service element. Aspects also generate a summary view cost estimation as a function of the time period, costs of the mapped tags and a geographic region productive factor that is assigned to a region identified as providing delivery of the service that is associated with the computer service element. The summary view cost estimation estimates a total cost of delivering the computing services of the computer service element over time as a function of the normalized, mapped tag cost metrics.

16 Claims, 5 Drawing Sheets

(56) References Cited

U.S. PATENT DOCUMENTS

| | | |
|---|---|---|
| 2011/0295722 A1 | 12/2011 | Reisman |
| 2012/0110462 A1* | 5/2012 | Eswaran ............... G06F 9/5072 |
| | | 715/736 |
| 2012/0272206 A1 | 10/2012 | Sengupta et al. |
| 2013/0166355 A1 | 6/2013 | Mohanty et al. |
| 2013/0191187 A1 | 7/2013 | Ludwig et al. |
| 2013/0301431 A1 | 11/2013 | Izzo et al. |
| 2015/0195347 A1* | 7/2015 | Luft ....................... H04L 67/10 |
| | | 709/203 |

OTHER PUBLICATIONS

EIC 3600 NPL Search Results—081618 (Year: 2018).*
EIC 3600 NPL (Fast and Focused) Search Results—091219 (Year: 2019).*
Audrey Apfel, Four Steps to Delivery, Optimize, Jul. 2003, p. 56.

* cited by examiner

DERIVING COMPARABLE PLANNED AND ACTUAL SERVICE DELIVERY COST METRICS

TECHNICAL FIELD

The present patent application is directed to automated devices and processes that generate cost estimates from pre-defined metrics, and more particularly to generating cost estimates for the delivery of computing services via shared pools of configurable computing resources.

BACKGROUND

Business models and plans drive the delivery of computing services through a variety of structures, for example via shared pools of configurable computing resources that include networks, network bandwidth, servers, processing, memory, storage, applications, virtual machines, and services. Estimating the costs of procuring, installing and maintaining the computing resources required in any given implementation is challenging. Without accurate cost estimates, comparing and choosing between different plans and models, or between different equipment and provider-specific implementations of the same model or plan, may not be practical or possible. Cost comparisons are also useful for service delivery organizations for improving service delivery efficiency and cost models used during service delivery pre-sales engagement.

BRIEF SUMMARY

In one aspect of the present invention, a method generates costs for a business plan from normalized cost metric values and includes mapping (via a processor that implements an automated process) each of a plurality of text artifacts of a business plan to different ones of a plurality of tags, wherein each of the tags include a cost as function of a time period for delivery of a service that is associated with a computer service element. The method further includes generating a summary view cost estimation as a function of the time period, the costs of the mapped tags and a geographic region productive factor that is assigned to a region identified as providing delivery of the service that is associated with the computer service element. The summary view cost estimation estimates a total cost of delivering the computing services of the computer service element over time as a function of the normalized, mapped tag cost metrics.

In another aspect, a system has a processor, computer readable memory and a computer readable storage medium with program instructions. The processor, when executing the stored program instructions, maps each of a plurality of text artifacts of a business plan to different ones of a plurality tags, wherein each of the tags include a cost as a function of a time period for delivery of a service that is associated with a computer service element. The processor further generates a summary view cost estimation as a function of the time period, the costs of the mapped tags and a geographic region productive factor that is assigned to a region identified as providing delivery of the service that is associated with the computer service element. The summary view cost estimation estimates a total cost of delivering the computing services of the computer service element over time as a function of the normalized, mapped tag cost metrics.

In another aspect, a computer program product has a computer readable storage medium with computer readable program code embodied therewith, the computer readable program code including instructions that, when executed by a processor, cause the processor to map each of a plurality of text artifacts of a business plan to different ones of a plurality of tags, wherein each of the tags include a cost as a function of a time period for delivery of a service that is associated with a computer service element. The processor is further thereby caused to generate a summary view cost estimation as a function of the time period, the costs of the mapped tags and a geographic region productive factor that is assigned to a region identified as providing delivery of the service that is associated with the computer service element. The summary view cost estimation estimates a total cost of delivering the computing services of the computer service element over time as function of the normalized, mapped tag cost metrics.

Another aspect comprehends a service that includes integrating computer readable program code into a computer system that includes a processor, a computer readable memory and a computer readable storage medium. The computer readable program code is embodied on the computer readable storage medium and includes instructions that, when executed by the processor via the computer readable memory, cause the processor to perform steps of mapping text artifacts of the business plan to the different tags having metric values, and generating summary view cost estimations as the function of a time period, of the costs of the mapped tags and of the geographic region productive factor that is assigned to a region identified as providing delivery of a service associated with a computer service element. In some aspects a service provider creates, maintains, or supports a computer infrastructure to perform process steps for one or more customers

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
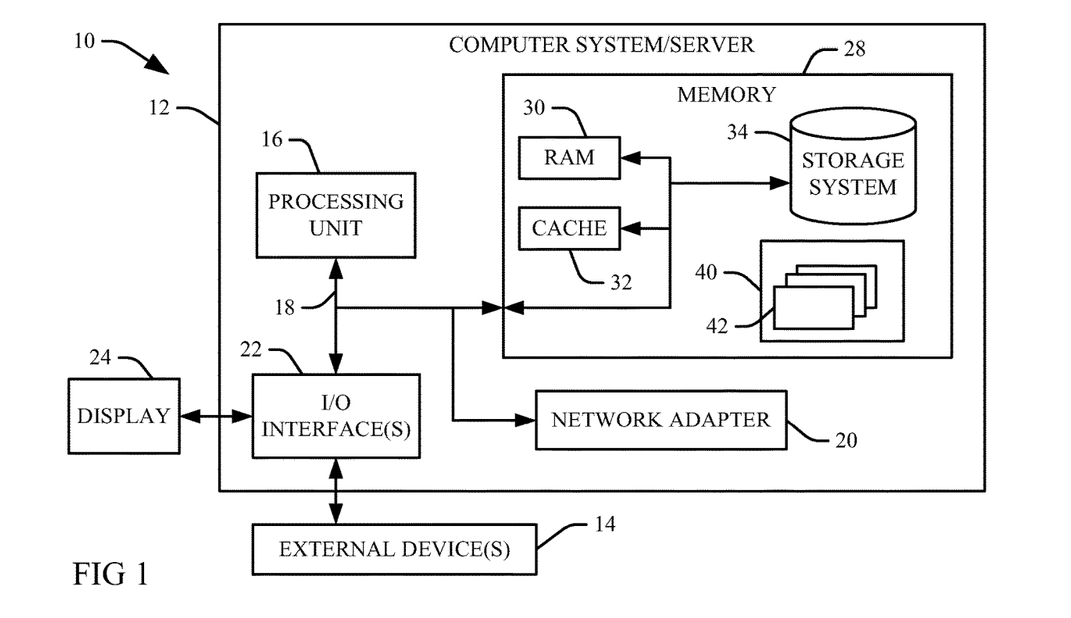
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
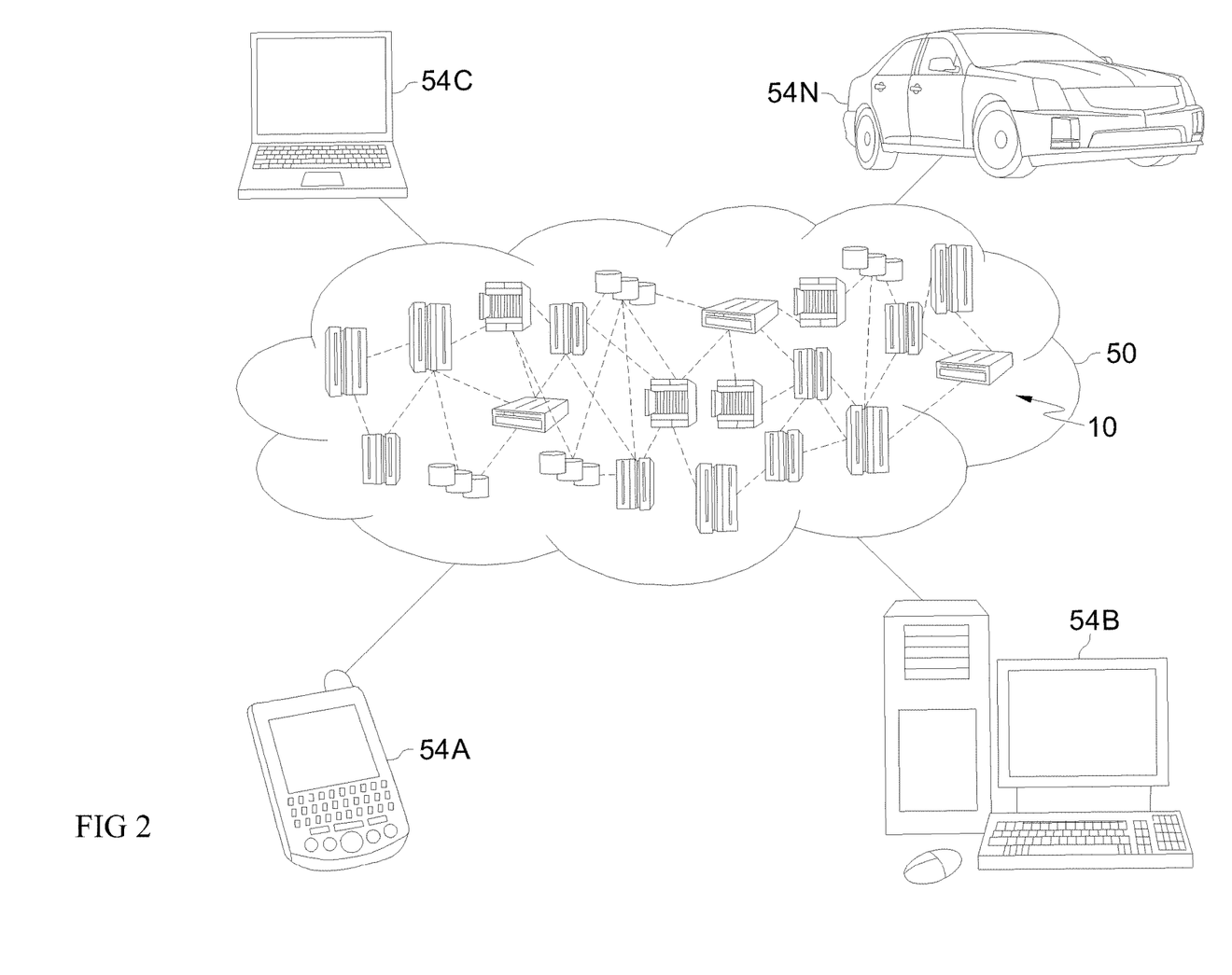
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
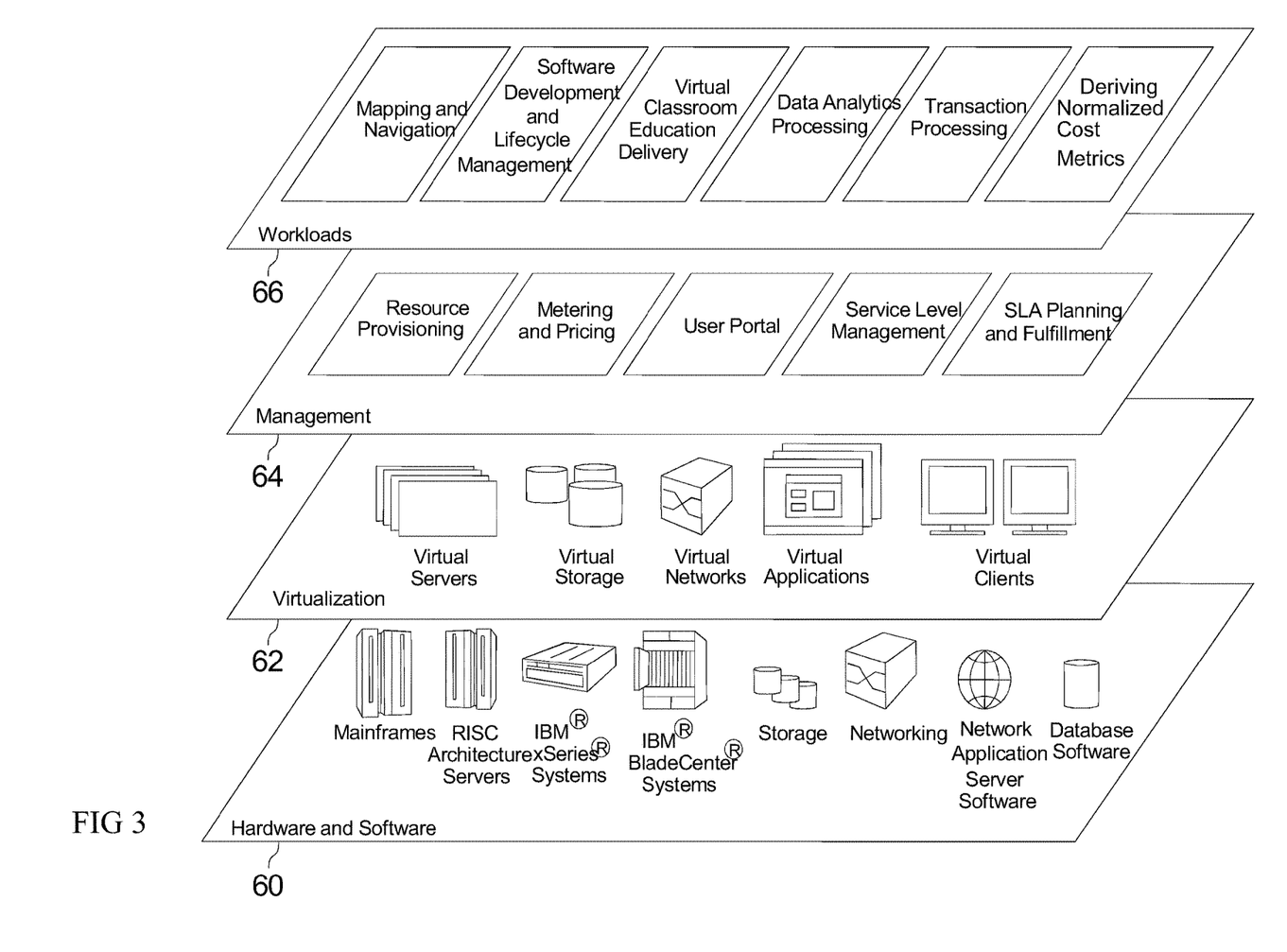
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing;

transaction processing; and deriving normalized cost metrics according to aspects of the present invention (as described more particularly below).

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 4:
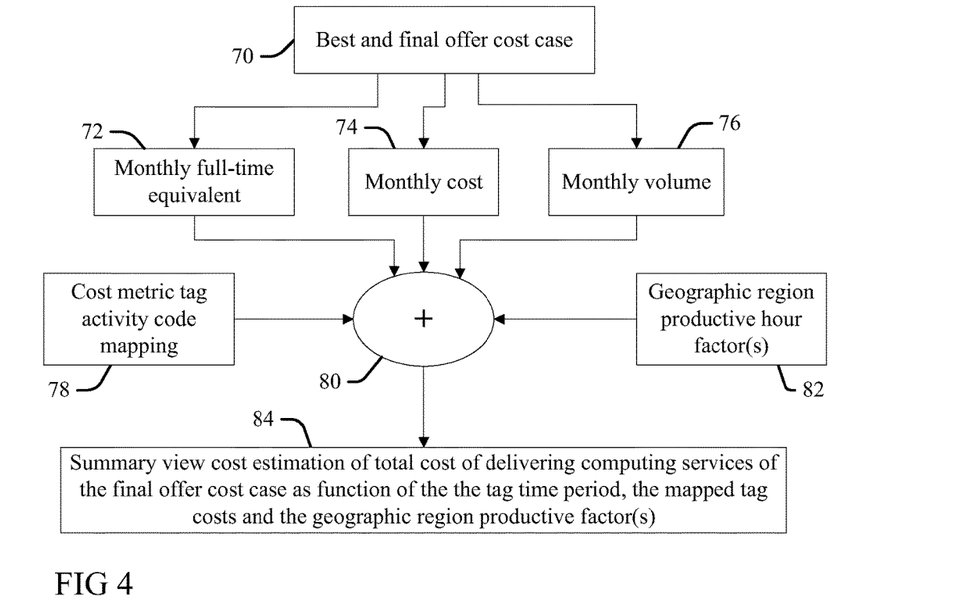
FIG. 4 is a flow chart illustration of a method or process aspect for generating costs for a business plan from normalized cost metric values according to the present invention.

FIG. 4 illustrates a method or process aspect for generating costs for a business plan from normalized cost metric values according to the present invention. A best and final offer (BAFO) cost case 70 of a business model is reflected in non-standard external system documentation that typically does not follow a format, and may include a number of different documents in a wide variety of unstructured and inconsistent text string, variable, spreadsheet, database or other form formats. Due to the wide variety of formats and descriptions used, the BAFO input documents 70 for any given contract are hard to compare. The present aspect provides processes and systems to normalize values embedded in these contracts to enable direct cost analysis or determination.

The BAFO documentation 70 is broken down in a pre-processing phase into an input format that includes service element artifacts that are categorized into monthly full-time equivalent (FTE) cost data 72, monthly cost 74 and monthly volume 76 components. The pre-processing service element artifacts identify different respective computer service elements that are used by the BAFO plan 70 to deliver services and comprehend competency, segment, tower type, service line, service element, country, phase, monthly FTE (cost) data, monthly image or volume data, and geographic region indicators and values. For example, the BAFO 70 may have a scope of ten servers, wherein one or more artifacts provide variables that quantify a number technician FTE's required on a monthly basis to provide operating services to support each of the ten servers, and this value is used to identify, determine or populate a monthly FTE 72 artifact value. Monthly cost limit 74 and monthly service volume 76 components are also determined from the BAFO case 70.

At 78 cost artifacts in the BAFO case 70 and in the monthly FTE's 72, monthly cost limits 74 and monthly service volume 76 components are mapped in an automated analysis to normalized cost metric tags. Each of the tags includes a cost as function of a period of time for delivery of a service that is associated with a computer service element.

The costs of the tags mapped at 78 are used at 80 to generate a summary view cost estimation at 84 as a function of the time period, of the costs of the mapped tags and of geographic region productive factor(s) 82 assigned to region(s) identified as providing services (via the computer service elements associated with the mapped tags). The summary view cost estimation 84 estimates a total cost of delivering the computing services of the BAFO cost case 70 over time as function of the normalized, mapped tag cost metrics.

Figure 5:
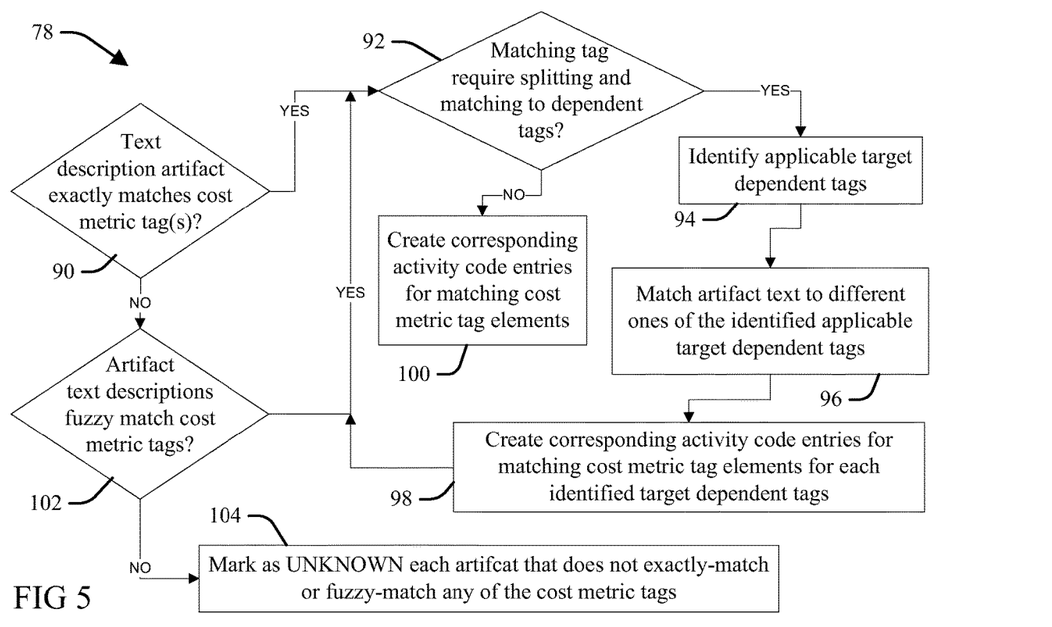
FIG. 5 is a flow chart illustration of a method or process aspect for derivation of normalized cost metrics from cost artifacts according to the present invention.

FIG. 5 illustrates a method or process aspect for mapping normalized cost metric tags to cost artifacts at 78 of FIG. 4. At 90 a processor executing computer system-executable instructions (for example, the processor 16) determines if the names, dates, service lines, service types or other text descriptions of the text artifacts broken down in the preprocessing phase into the input format within the monthly full-time equivalent (FTE) 72, monthly cost 74 and monthly volume 76 components exactly match one or more pre-defined cost metric tags (CMT's). The CMT's are each associated with (or represent) different, predefined computing resource elements that have predefined cost metric values.

More particularly, the monthly FTE 72, cost 74 and volume 76 artifacts include BAFO case 70 customer names and relevant dates within string text or otherwise determined from user and version metadata. The cost metric tags are also sometimes referred to as framework tags. In one illustrative but non-limiting aspect the CMT tags include service organization tags, (server support, mainframe support, end user services, service management etc.), and service type tags that depend from the service organization tags and describe the type of service provided (for example, Intel or Unix server, mainframe, database, storage, application hosting services, call center, desk side support, change management, service level agreement (SLA) management, etc.) (Intel, Intel logo, Intel Inside, Intel Inside logo, Intel Centrino, Intel Centrino logo, Celeron, Intel Xeon, Intel SpeedStep, Itanium, and Pentium are trademarks or registered trademarks of Intel Corporation or its subsidiaries in the United States and other countries; UNIX is a registered trademark of The Open Group in the United States and other countries.)

In the present example, a set of service offering tags depend from the service type tags and provide specificity as to the service offered (Intel server systems management, mainframe server systems management, server sub system management, etc.). Service provided tags (server management, batch operations, storage management, helpdesk, etc.) depend from the service offering tags. Supporting tags depend from the service provided tags and include delivery phase tags (transition, transformation, or steady state, etc.) and geographic region tags, which may include country tags (USA, Canada, Brazil, or India, etc.), multi-nation tags (European Union, North American Free Trade Agreement region, Pacific rim, etc.) or regional tags differentiated within a national boundary (for example, Catalonia or Basque regions within Spain), and still other useful regional demarcations will be apparent to one skilled in the art. Still other tags may also be incorporated to depend from and thereby sub-categorize one of the other tags, including, service resource location, service role, delivery phase, etc.

The tags are matched (at 90 of FIG. 5) with monthly FTE 72, cost 74 and volume 76 artifacts. For each artifact text that matches one of the cost metric tags at 90, at 92 the process determines if the matching tag has a set of target dependent metric tags within a dependent hierarchy that require matching to artifact text, thereby further splitting the cost metrics of the matching tag into one or more different target dependent tags for further cost determinations. In some aspects, the process identifies known computing resource element(s) of the matching tag at 92 and determines whether cost values for target dependent tags of the matching tag that are associated with said computing resource are specified, and if so one or more of the appropriate dependent tags are identified and selected at 94. For example, for a "server support" tag matched at 92, dependent service type tags of "Intel" or "UNIX domain" are identified at 94 and selected at 96 for matching the monthly FTE 72, cost 74 and volume 76 artifact text to different, identified applicable target dependent tags, thereby splitting the cost metrics of the matching tag as a function of the matching. At 98 corresponding activity code entries for the matching tag elements for the identified dependent tags are created. This process repeats at 92 until all dependent cost metric tags are identified, selected and have corresponding activity code entries created for them. Thus, at 100 the processor creates corresponding activity code entries for the matching metric tags that are determined at 92 as not requiring further splitting into any (more) dependent tags.

Figure 6:
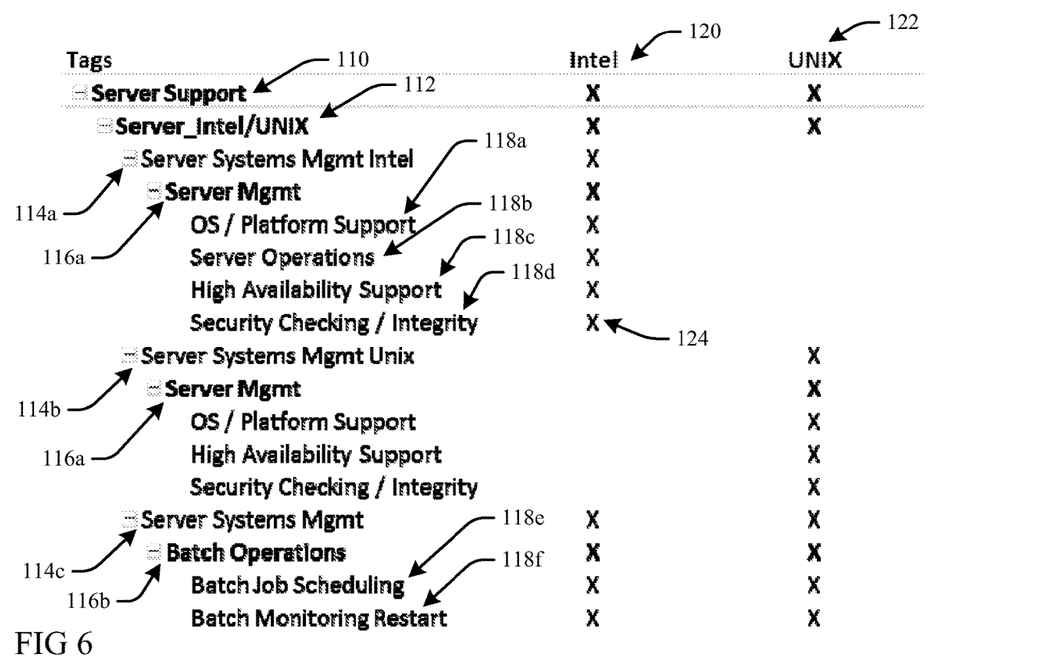
FIG. 6 is a tabular illustration of selection and population of values for matching tags and their dependencies.

FIG. 6 provides a tabular illustration of selection and population of values for matching tags and their dependencies at 92-94-96-98-100 of FIG. 5. Thus, tag matching at 92 determines that the monthly FTE 72, cost 74 and volume 76 text artifacts match to a "server support" tag 110 of set of primary (first level) service organization tags. The process at 94 determines that this tag subject matter splits into at least a dependent "server_Intel/UNIX" tag 112 of a set of dependent (second level) service type tags (the others are not shown in this view).

The tags are also split into two different service lines that comprise different computing platforms: in the present example Intel 120 or UNIX 122 (though other service lines and computing platforms may be practiced), which further splits up and allocate cost metrics according to the respective Intel or UNIX equipment and service lines identified in the artifacts and matched to the tags. Corresponding activity code entries 124 are created (at 98, after each splitting at 96, FIG. 5) for each tag identified as matching an artifact.

With each iteration of the process at 94 dependent tags are determined and corresponding activity code entries 124 are created for subsequent levels of dependency. Thus, it is determined that the second level "server_Intel/UNIX" tag 112 is further split into one or more third level, service offering dependent tags 114, namely Intel server systems management 114a, UNIX server systems management 114b and generic server systems management 114c tags. The third level service offering tags 114 are further split into fourth level "service provided" tags 116 that are dependent therefrom: server management 116a and batch operations 116b. The fourth level server management 116a tags may be further split into fifth level services tags 118a, 118b, 118c and 118d that are in the present example differ from the possible fifth level services tags 118e and 118f available for splitting off from the fourth level "batch operations" tag 116b.

Referring again to FIG. 5, for each computing resources artifact description text that does not exactly-match any of the predefined tags at 90, at 102 the process determines if the artifact has a fuzzy match to one of the predefined tags. Aspects may determine fuzzy matches at 102 by expanding artifact acronyms or abbreviations and determining if the expanded text meets exact match criteria.

Some aspects may determine fuzzy matches by using n-gram approximate match processes. An "n-gram" is a contiguous sequence of "n" items from a given sequence of text or speech. The items can be phonemes, syllables, letters, words or base pairs according to the application. The n-grams typically are collected from a text or speech corpus. An n-gram of size 1 is referred to as a "uni-gram"; size 2 is a "bi-gram" (or, less commonly, a "di-gram"); and size 3 is a "tri-gram". Larger sizes are sometimes referred to by the value of n, e.g., "four-gram", "five-gram", and so on. One aspect uses tri-gram matching for fuzzy matching at 102, though other examples may use other "n-gram" sizes.

Still other fuzzy match processes appropriate for practicing at 102 will be apparent to one skilled in the art.

For each computing resources service element description text that is determined to fuzzy-match one of the CMT's at 102, the processor applies processes described above at 92/94/96/98/100 to create corresponding activity code entries for the fuzzy-matched tags and their dependent tags.

At 104 the process marks as UNKNOWN each computing resources service element description text artifact that does not exactly-match at 90, or fuzzy-match at 102, any of the predefined tags. The UNKNOWN marker signifies that said service elements are not resolved into tags by the automated process described above, so that a subject matter expert (SME) or other manual or automatic process may identify and resolve the identification of the element.

The service delivery cost artifacts describe the service delivery cost using a hierarchical taxonomy, wherein the individual service elements analyzed at step 90 represent the actual activities being done within the business plan or model under analysis. The aspect described above thus derives normalized service delivery cost metrics from planned cost artifacts: translating text descriptions into tags that have pre-determined, normalized metric value that may be added up, combined or otherwise used to generate predicted cost values for the input plan 70 (FIG. 3) that are useful for comparing against anticipated or estimated costs for implementing the plan 70, and against values observed during actual service delivery subsequent to implementation of the plan.

Visibility into such comparisons enables service delivery organizations to improve both their service delivery efficiency and the cost models used during service deliver pre-sales engagement. Aspects derive normalized cost metrics in a hierarchical structure which can be compared with the actual delivery metrics. For example, one service element in a cost artifact may correspond to several activities performed in actual delivery, primarily because the same element could be delivered by different service domain groups. The present aspect recognizes this dependent branching of tasks and their associated costs and provides means for predicting the total costs along each branch as sums or other functional combinations of the metric value assigned to associated matching tags, even where the plan input 70 does not specifically anticipate or overtly map out dependent relationships that are identified through the tag matching process.

Further, any given service element name within the input plan 70 may not match a requisite performed activity that has a predetermined metric tag cost exactly, and thus may not be accounted for in prior art, manual budget estimation processes performed manually. In contrast, the fuzzy-matching step 102 of the aspect described above may match such an aspect to an appropriate metric tag, and further identify appropriate dependent tags from the matched tag, thereby capturing cost metrics, or dependent hierarchical relations not specified or realized under the prior art.

Aspects enable identifying areas for service delivery improvement by comparing planned service delivery costs with the actual costs at the granularity of the metrics used to define the tag values. For example, the aspects described thus far use a monthly time period as the basis for the metric values that quantify for service element and activity task costs associated with each tag (cost per month). By assessing actual costs expended in implementing the plan on a monthly basis, the predicted costs derived from the metric tags may be readily compared top actual costs. This enables delivery teams to plan and focus the areas to target productivity improvement actions on a monthly granularity. The month period basis of the tag metrics discussed thus far is only one illustrative but not limiting or exhaustive example, and one killed in the art will appreciate that other time periods may be practiced as the basis for the tag metrics and the cost estimates derived therefrom.

Figure 7:
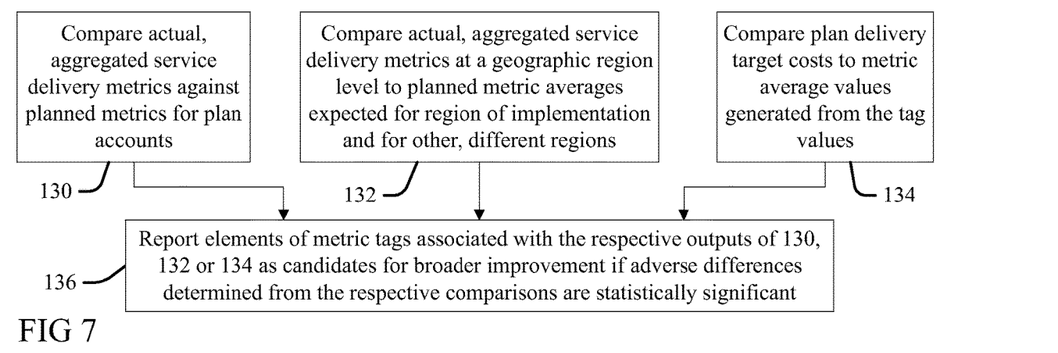
FIG. 7 is a flow chart illustration of a method or process according to the present invention for comparing service delivery metrics across accounts.

Aspects of the present invention may compare the actual delivery cost of an individual account with the planned cost of the same account, or of a cluster of similar accounts, on industry, geography or other bases or levels on a granular, period basis. FIG. 7 illustrates one aspect according to the present invention for providing aggregate metric comparisons. At 130 the process or system compares actual, aggregated service delivery metrics for an implemented plan (BAFO 70) against the planned metrics as determined from matched tag values for all accounts associated with the plan. At 132 actual, aggregated service delivery metrics are compared at a geographic region level to the planned metric averages expected for a region of the implementation of the plan 70, and for other, different regions. At 134 the delivery target costs defined in the BAFO plan 70 are compared to the metric average values generated from the tag values. At 136 the metric tags associated with the respective outputs of 130, 132 and 134 are reported as candidates for broader improvement if adverse differences determined from the respective comparisons are statistically significant.

Figure 8:
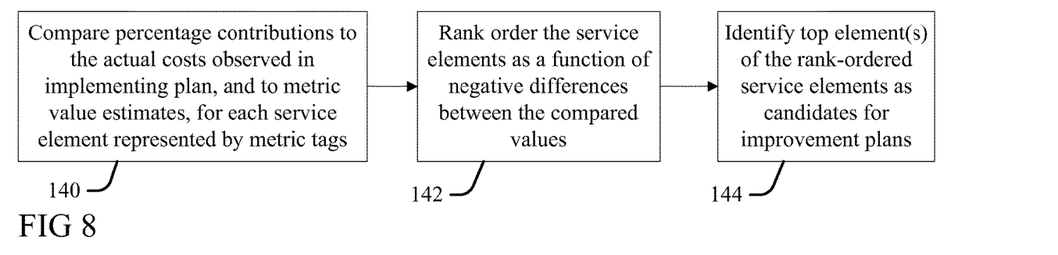
FIG. 8 is a flow chart illustration of a method or process according to the present invention for providing individual service element comparison views.

Granular analysis of the data at an individual service element level may be performed to understand the differentials to identify major areas for potential improvements, via observing a level of a matched tag or subset of tags. FIG. 8 illustrates one example for providing an individual service element view. At 140 the process or system compares percentage contributions to the actual costs observed in implementing the BAFO plan 70 to the metric value estimates determined from the tag values at 84 (FIG. 4) for each service element represented by one or more matched metric tags. At 142 the service elements are rank ordered as a function of negative differences between the values compared at 140, with the elements having matched tag values with the largest, most significant difference order to the top of a listing of the rank ordering. At 144 one or more of the elements at the top of the rank-ordered service elements (for example, the top three) are identified as candidates for improvement plans.

The periods used for the metric tag value definitions may also be used a basis for tracking the actual service delivery costs with respect to periodic targets indicated in the delivery plans estimated at 84 (FIG. 4) and for providing analysis of trends to predict targets for service delivery costs. Aspects may forecast revised targets based on analysis of historical actual service delivery cost data. Furthermore, revised targets can also be incorporated into cost models used during the services delivery sales process for more accurate costing. This enables service delivery providers to remain competitive.

Figure 9:
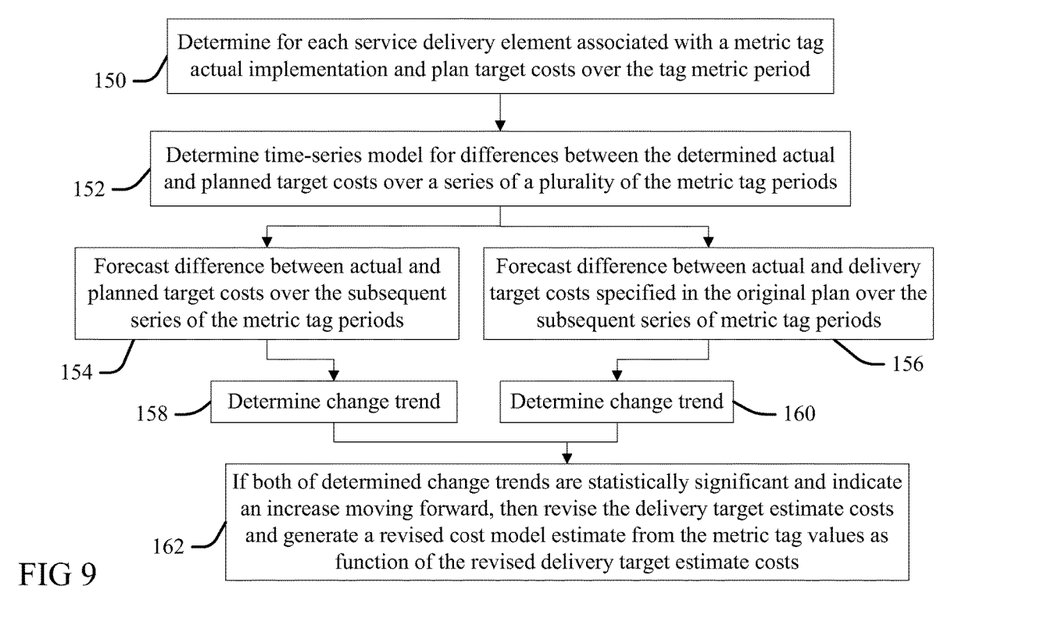
FIG. 9 is a flow chart illustration of a method or process according to the present invention for performing a time-series comparative analysis of the actual delivery normalized cost metrics against the identical metrics for planned service delivery costs.

FIG. 9 illustrates an aspect of the invention that performs a time-series comparative analysis of the actual delivery normalized cost metrics against the identical metrics for planned service delivery costs. At 150, for each service delivery element associated with a metric tag, the method or process determines actual implementation and plan target costs over the tag metric period (in this example, over a month), wherein the plan target costs are known for a projected (contract) duration of the plan implementation. At 152 a time-series model is determined for differences between the determined actual and planned target costs over a series of a plurality of the metric tag periods (for example, over at least twelve months where the tag metrics are based on monthly periods). In some aspects, this generates a linear model or graphic representation at 152, though other presentations may be practiced. At 154 the difference between actual and planned target costs is forecast over a subsequent series of the metric tag periods (for example, over a next quarter (three months) for a metric tag basis period of one month). At 156, the difference between actual and delivery target costs (as specified in the original plan 70) is forecast over the same, subsequent series of metric periods.

At 158 and 160, respective trends of changes in value of the differences determined at 154 and 156 over the subsequent series of metric periods are determined. If both of the trends determined at 158 and 160 are statistically significant and indicate a widening (increase) moving forward over the subsequent series of metric periods, then at 162 the process revises the delivery target estimate costs upward or downward as needed to reduce the increasing value differences, and generate a revised cost model estimate from the metric tag values (at 84, FIG. 4) as function of the revised delivery target estimate costs.

The comparisons of FIG. 9 may incorporate additional target values for the normalized metrics, for example reflecting the expected productivity improvements in service delivery. Aspects may cluster the service delivery costs for individual accounts based on the industry and geography of the account for benchmark comparisons. Such an analysis predicts a revised target value which can be used for more effective tracking. Also, revised target values may indicate revisions to the cost models for subsequent series of metric periods that are defined to correlate to significant business periods, for example, to be defined by known sales cycles.

What is claimed is:

1. A method for generating cost estimates for delivery of a computing service, comprising:

mapping, via a processor implementing an automated process, each of a plurality of text artifacts of a business plan to different ones of a plurality of tags as a function of matching unstructured text content within each of the text artifacts to text content within the plurality of tags, wherein each of the plurality of tags comprise a cost as a function of a time period for delivery of a computing service via shared pools of configurable computing resources that is associated with a computer service element, and wherein the matched unstructured text content comprises name, date, service line and service type text content, wherein the plurality of tags are organized into a dependent hierarchy as a function of service organization and service type, with each of the plurality of tags associated with different service types depending from one of the plurality of tags associated with the service organization, wherein the function of matching unstructured text content of the text artifacts to text content of the plurality of tags comprises a fuzzy matching process;

determining for each of the plurality of mapped tags whether said mapped tag has a set of target dependent metric tags;

in response to determining that a first of the plurality of mapped tags that comprises text content matching unstructured text content of a first of the text artifacts further comprises a first set of target dependent metric tags, splitting the cost of the first of the plurality of mapped tags into the first set of target dependent metric tags that each have text content matching the unstructured text content of the first text artifact; and generating a summary view cost estimation as a function of a time period for the business plan, of the costs of the plurality of mapped tags and of a geographic region productive factor that is assigned to a region identified as providing delivery of the computing service via the shared pools of configurable computing resources that is associated with the computer service element, wherein the summary view cost estimation comprises a total cost of delivering the computing services of the computer service element over time as a function of normalized values of the first set of target dependent metric tags.

2. The method of claim 1, further comprising:

reformatting an input of the business plan that is in a first format into a plurality of service element components that are each associated with the time period and comprise the plurality of text artifacts in a second format that is different from the first format, wherein the step of mapping the plurality of text artifacts of the business plan to the plurality of tags maps the plurality of text artifacts in the second format to the plurality of tags.

3. The method of claim 2, further comprising:

categorizing a plurality of the text artifacts in the second format that have full-time equivalent values into a first subset group;

categorizing a plurality of the text artifacts in the second format that have monthly cost values into a second subset group that is different from the first subset group; and categorizing a plurality of the text artifacts in the second format that have monthly volume values into a third subset group that is different from the first and the second subset groups.

4. The method of claim 2, wherein the plurality of the text artifacts in the second format comprise competency, segment, tower type, service line, service element, country, phase, monthly full time equivalent cost data, monthly image data, monthly volume data, and geographic region indicators.

5. The method of claim 1, wherein the fuzzy matching process comprises a process selected from a group consisting of:

expanding acronyms and abbreviations within the plurality of text artifacts into expanded artifacts, and determining whether the expanded artifact text matches the plurality of tags; and using tri-gram approximate matching to the plurality of tags.

6. The method of claim 1, wherein the dependent hierarchy further comprises different service lines.

7. The method of claim 6, wherein the different service lines comprise different computing platforms.

8. A system for generating cost estimates for delivery of a computing service, comprising:

a processor; and a computer readable storage medium in circuit communication with the processor, wherein the computer readable storage medium is not a transitory signal per se;

wherein the processor, when executing program instructions stored on the computer readable storage medium:

maps each of a plurality of text artifacts of a business plan to different ones of a plurality of tags as a function of matching unstructured text content within each of the text artifacts to text content within the plurality of tags, wherein each of the plurality of tags comprise a cost as a function of a time period for delivery of a computing service via shared pools of configurable computing resources that is associated with a computer service element, and wherein the matched unstructured text content comprises name, date, service line and service type text content, wherein the plurality of tags are organized into a dependent hierarchy as a function of service organization and service type, with each of the plurality of tags associated with different service types depending from one of the plurality of tags associated with the service organization, wherein the function of matching unstructured text content of the text artifacts to text content of the plurality of tags comprises a fuzzy matching process;

determines for each of the plurality of mapped tags whether said mapped tag has a set of target dependent metric tags;

in response to determining that a first of the plurality of mapped tags that comprises text content matching unstructured text content of a first of the text artifacts further comprises a first set of target dependent metric tags, splitting the cost of the first of the plurality of mapped tags into the first set of target dependent metric tags that each have text content matching the unstructured text content of the first text artifact; and generates a summary view cost estimation as a function of a time period for the business plan, of the costs of the plurality of mapped tags and of a geographic region productive factor that is assigned to a region identified as providing delivery of the computing service via the shared pools of configurable computing resources that is associated with the computer service element, wherein the summary view cost estimation comprises a total cost of delivering the computing services of the computer service element over time as a function of normalized values of the first set of target dependent metric tags.

9. The method of claim 8, wherein the processor, when executing the program instructions stored on the computer readable storage medium, reformats an input of the business plan that is in a first format into a plurality of service element components that are each associated with the time period and comprise the plurality of text artifacts in a second format that is different from the first format, and maps the plurality of text artifacts of the business plan to the plurality of text artifacts in the second format to the plurality of tags.

10. The system of claim 9, wherein the fuzzy matching process is a process selected from a group consisting of:
  expanding acronyms and abbreviations within the plurality of text artifacts into expanded artifacts, and determining whether the expanded artifact text matches the plurality of tags; and
  using tri-gram approximate matching to the plurality of tags.

11. The system of claim 8, wherein the dependent hierarchy further comprises different service lines.

12. The system of claim 11, wherein the different service lines comprise different computing platforms.

13. A computer program product for generating cost estimates for delivery of a computing service, comprising: a computer readable storage medium having computer readable program code embodied therewith, wherein the computer readable storage medium is not a transitory signal per se, the computer readable program code comprising instructions that, when executed by a processor, cause the processor to:
  map each of a plurality of text artifacts of a business plan to different ones of a plurality of tags as a function of matching unstructured text content within each of the text artifacts to text content within the plurality of tags, wherein each of the plurality of tags comprise a cost as a function of a time period for delivery of a computing service via shared pools of configurable computing resources that is associated with a computer service element, and wherein the matched unstructured text content comprises name, date, service line and service type text content, wherein the plurality of tags are organized into a dependent hierarchy as a function of service organization and service type, with each of the plurality of tags associated with different service types depending from one of the plurality of tags associated with the service organization, wherein the function of matching unstructured text content of the text artifacts to text content of the plurality of tags comprises a fuzzy matching process;
  determine for each of the plurality of mapped tags whether said mapped tag has a set of target dependent metric tags;
  in response to determining that a first of the plurality of mapped tags that comprises text content matching unstructured text content of a first of the text artifacts further comprises a first set of target dependent metric tags, splitting the cost of the first of the plurality of mapped tags into the first set of target dependent metric tags that each have text content matching the unstructured text content of the first text artifact; and
  generate a summary view cost estimation as a function of a time period for the business plan, of the costs of the plurality of mapped tags and of a geographic region productive factor that is assigned to a region identified as providing delivery of the computing service via the shared pools of configurable computing resources that is associated with the computer service element, wherein the summary view cost estimation comprises a total cost of delivering the computing services of the computer service element over time as a function of normalized values of the first set of target dependent metric tags.

14. The computer program product of claim 13, wherein the computer readable program code instructions, when executed by the processor, further cause the processor to reformat an input of the business plan that is in a first format into a plurality of service element components that are each associated with the time period and comprise the plurality of text artifacts in a second format that is different from the first format, and to map the plurality of text artifacts of the business plan to the plurality of text artifacts in the second format to the plurality of tags.

15. The computer program product of claim 14, wherein the fuzzy matching process is a process selected from a group consisting of:
  expanding acronyms and abbreviations within the plurality of text artifacts into expanded artifacts, and determining whether the expanded artifact text matches the plurality of tags; and
  using tri-gram approximate matching to the plurality of tags.

16. The computer program product of claim 13, wherein the dependent hierarchy further comprises different service lines, and wherein the different service lines comprise different computing platforms.

* * * * *